JANE A. FOX.
Dish-Drainer.

No. 160,176.  Patented Feb. 23, 1875.

WITNESSES:  INVENTOR:

UNITED STATES PATENT OFFICE.

JANE ANN FOX, OF STAMFORD, NEW YORK.

IMPROVEMENT IN DISH-DRAINERS.

Specification forming part of Letters Patent No. 160,176, dated February 23, 1875; application filed December 18, 1874.

*To all whom it may concern:*

Be it known that I, JANE A. FOX, of Stamford, in the county of Delaware and State of New York, have invented certain new and useful Improvements in Dish-Drainers; and I do hereby declare that the following is a full, clear, and exact description thereof, reference being had to the accompanying drawings, and to the letters of reference marked thereon, which form part of this specification.

The nature of my invention consists in the construction and arrangement of an apparatus for washing and draining dishes, glassware, knives, forks, &c., as will be hereinafter more fully set forth.

In order to enable others skilled in the art to which my invention appertains to make and use the same, I will now proceed to describe its construction and operation, referring to the annexed drawing, in which—

Figure 1:
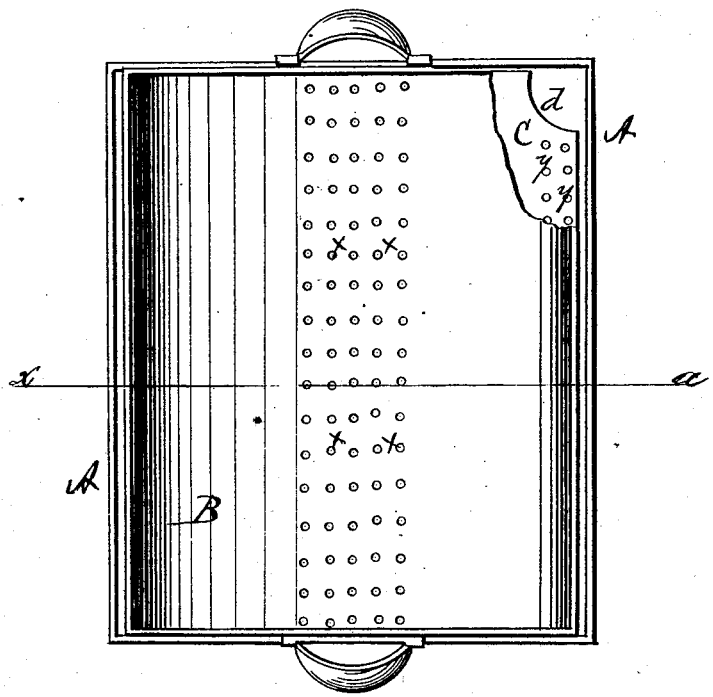
Figure 2:
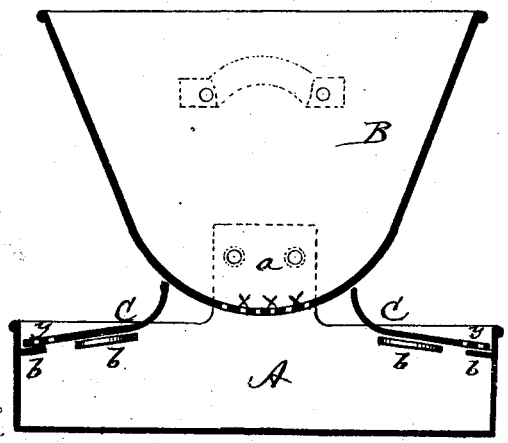

Figure 1 is a plan view of my invention, one corner being broken off. Fig. 2 is a transverse vertical section of the same through the line $x\ x$, Fig. 1.

A represents a flat rectangular pan of any suitable dimensions. From the center of each end of the pan A extends an ear or projection, $a$, and to these two ears is riveted the drainer B. This drainer is a vessel of the same length as the pan A, and provided with a concave bottom, in which are a number of very small perforations, $x\ x$. The space on each side of the drainer B of the pan A is covered by a plate, C, which rests upon ledges or lugs $b\ b$ within the pan A, and has its inner part curved upward against the concave bottom of the drainer. The plates C C are inclined, as shown, and along the outer lower edges are a number of small perforations, $y\ y$. One or both of the lower corners of each plate C is cut out, as shown at $d$ in Fig. 1, for the insertion of the finger, when desired, to remove the plates for cleaning or other purposes.

The object and use of my invention are as follows: Dishes to be washed are placed in the drainer B, and hot water poured over them, which water removes the grease, &c., from the dishes, and passes with the same through the perforations $x$ into the pan A. These perforations being small, the steam will not pass up through them again.

The dishes by this method will become perfectly clean and dry without the use of dish-cloths or towels, thus obviating a source of great annoyance in large families.

The plates C C are intended, one for glassware and the other for knives, forks, &c., and being inclined the edge of the pan forms a rim around them to prevent the articles from sliding off. These articles (knives and forks) can be easily taken off when cleaned, to be wiped dry to prevent rusting.

Having thus fully described my invention, what I claim as new, and desire to secure by Letters Patent, is—

1. The combination of the pan A, provided with ears $a\ a$, and the drainer B, having concave bottom with perforations $x\ x$, substantially as and for the purposes herein set forth.

2. The combination of the pan A, with ears $a\ a$, the drainer B, with perforated concave bottom, and the inclined plates C C, provided with perforations $y\ y$, substantially as and for the purposes herein set forth.

In testimony that I claim the foregoing as my own I affix my signature in presence of two witnesses.

JANE ANN FOX.

Witnesses:
B. M. HASBROUCK,
A. J. CHAMPION.